(12) United States Patent
Hoshina et al.

(10) Patent No.: US 8,178,244 B2
(45) Date of Patent: May 15, 2012

(54) NON-AQUEOUS ELECTROLYTE BATTERY AND BATTERY PACK

(75) Inventors: Keigo Hoshina, Yokohama (JP); Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 610 days.

(21) Appl. No.: 12/191,672

(22) Filed: Aug. 14, 2008

(65) Prior Publication Data

US 2009/0081551 A1 Mar. 26, 2009

(30) Foreign Application Priority Data

Sep. 26, 2007 (JP) ................................. 2007-249510

(51) Int. Cl.
*H01M 4/485* (2010.01)
*H01M 4/66* (2006.01)
*H01M 10/056* (2010.01)

(52) U.S. Cl. ................ 429/231.95; 429/231.5; 429/245; 429/324

(58) Field of Classification Search ............. 429/9, 184, 429/223, 224, 128, 231.5, 231.8, 231.1, 137, 429/231.95, 149, 324, 247, 245; 29/623.3
See application file for complete search history.

(56) References Cited

U.S. PATENT DOCUMENTS

| | | | | |
|---|---|---|---|---|
| 6,001,139 | A | * | 12/1999 | Asanuma et al. ............. 29/623.3 |
| 2006/0057433 | A1 | * | 3/2006 | Ando et al. ........................ 429/9 |
| 2007/0009794 | A1 | * | 1/2007 | Takami et al. ................. 429/184 |

FOREIGN PATENT DOCUMENTS

| | | | |
|---|---|---|---|
| EP | 1057783 A | * | 12/2000 |
| JP | 10-247496 | | 9/1998 |
| JP | 11-283624 | | 10/1999 |
| JP | 2000-268822 | | 9/2000 |

OTHER PUBLICATIONS

U.S. Appl. No. 12/428,131, filed Apr. 22, 2009, Inagaki, et al.
U.S. Appl. No. 12/212,257, filed Sep. 17, 2008, Takami, et al.

* cited by examiner

*Primary Examiner* — Jonathan Crepeau
*Assistant Examiner* — Kenneth Douyette
(74) *Attorney, Agent, or Firm* — Oblon, Spivak, McClelland, Maier & Neustadt, L.L.P.

(57) ABSTRACT

A non-aqueous electrolyte battery comprises a negative electrode comprising a current collector, and a negative electrode layer formed on one or both surfaces of the current collector, a positive electrode, and a separator interposed between the negative electrode and the positive electrode. The negative electrode layer comprises a plurality of layers laminated each other and containing a different active material each other, the layers comprising a first layer which is contacted with the current collector and contains spinel-type lithium titanate as an active material, and a second layer which is disposed to face the separator and contains Ramsdellite-type lithium titanate or anatase-type titanium oxide as an active material.

13 Claims, 3 Drawing Sheets

NON-AQUEOUS ELECTROLYTE BATTERY AND BATTERY PACK

CROSS-REFERENCE TO RELATED APPLICATIONS

This application is based upon and claims the benefit of priority from prior Japanese Patent Application No. 2007-249510, filed Sep. 26, 2007, the entire contents of which are incorporated herein by reference.

BACKGROUND OF THE INVENTION

1. Field of the Invention

This invention relates to a non-aqueous electrolyte battery and to a battery pack.

2. Description of the Related Art

Studies are now being vigorously made on a non-aqueous electrolyte battery which is designed to be charged and discharged by the movement of lithium ion between a negative electrode and a positive electrode for the purpose of using the battery as a high-energy density battery.

The non-aqueous electrolyte battery is expected to be useful as a middle or large scale power source in addition to the utilization thereof as a power source for miniature electronic devices. When the battery is to be used as a middle or large scale power source, the battery is demanded to be long in useful life and excellent in durability.

In the non-aqueous electrolyte battery, lithium transition metal composite oxides have been employed for the positive electrode thereof and carbonaceous materials have been employed for the negative electrode thereof. As for the transition metal, Co, Mn, Ni are now used.

In recent years, a non-aqueous electrolyte battery used negative electrode active materials which are capable of exhibiting an enhanced electrical potential in absorbing/desorbing lithium as compared with carbonaceous materials has been developed and the studies thereof are now continued. Among the negative electrode active materials of this kind, spinel type lithium titanate is considered as promising in terms of enhancing the charge/discharge cycle characteristics since this material is substantially free from changes in volume on the occasion of charge/discharge reactions.

Meanwhile, as described in JP-A 10-247496 (KOKAI) and JP-A 2000-268822 (KOKAI), the Ramsdellite-type lithium titanate or anatase-type titanium oxide is capable of exhibiting a greater theoretical capacity as compared with spinel-type lithium titanate. However, since the volume of these negative electrode materials are subject to shrink or expand due to the charge/discharge reactions, the twisting or peeling of the negative electrode is caused to occur, resulting in the deterioration of charge/discharge cycle characteristics of battery.

Further, JP-A 11-283624 (KOKAI) discloses a negative electrode having an negative electrode layer, the layer comprising negative active materials containing spinel-type lithium titanate which is coexisted with Ramsdellite-type lithium titanate. However, the non-aqueous electrolyte battery having such negative electrode is not necessarily satisfactory in charge/discharge cycle characteristics.

A negative electrode active material which is capable of exhibiting an enhanced electrical potential in absorbing/desorbing lithium as compared with carbonaceous materials is large in theoretical capacity and excellent in electron conductivity and in ionic conductivity. However, some of such negative electrode active materials are caused to shrink or expand in volume due to the charge/discharge reactions. When the volume of negative electrode active material is shrunk or expanded due to the charge/discharge reactions, the twisting negative electrode or the peeling of the negative electrode layer from the current collector is caused to occur, resulting in the deterioration of charge/discharge cycle characteristics of battery.

BRIEF SUMMARY OF THE INVENTION

According to a first aspect of the present invention, there is provided a non-aqueous electrolyte battery comprising:

a negative electrode comprising a current collector, and a negative electrode layer formed on one or both surfaces of the current collector;

a positive electrode; and a separator interposed between the negative electrode and the positive electrode;

wherein the negative electrode layer comprises a plurality of layers laminated each other and containing a different active material each other, the layers comprising a first layer which is contacted with the current collector and contains spinel-type lithium titanate as an active material, and a second layer which is disposed to face the separator and contains Ramsdellite-type lithium titanate or anatase-type titanium oxide as an active material.

According to a second aspect of the present invention, there is provided a battery pack comprising a plurality of the aforementioned non-aqueous electrolyte batteries which are electrically connected with each other in series, in parallel, or in series and parallel.

DETAILED DESCRIPTION OF THE INVENTION

Next, a non-aqueous electrolytic secondary battery and a battery pack according to the embodiments of the present invention will be explained with reference to drawings.

First Embodiment

The non-aqueous electrolyte battery according to a first embodiment is provided with a negative electrode, a positive electrode and a separator which is interposed between the negative electrode and the positive electrode. An electrode group comprising the negative electrode, the positive electrode and the separator is placed inside an outer case. A non-aqueous electrolyte is also accommodated at least in this electrode group.

Next, details of each of the negative electrode, the positive electrode, the separator, the non-aqueous electrolyte and the outer case will be discussed as follows.

1) Negative Electrode

The negative electrode comprises a current collector, and a negative electrode layer formed on one or both surfaces of the current collector.

This negative electrode layer comprises a plurality of layers laminated each other and containing a different active material each other. This plurality of layers comprise a first layer which is contacted with the current collector and contains spinel-type lithium titanate as an active material, and a second layer which is disposed to face the separator and contains Ramsdellite-type lithium titanate or anatase-type titanium oxide ($TiO_2$) as an active material. The surface of the second layer faced to the first layer is directly contacted with the first lay or via a third layer, which contains an active material, with the first layer. The spinel-type lithium titanate is represented by a composition formula of: $Li_{4+x}Ti_5O_{12}$, wherein X is $0 \leq x \leq 3$. The Ramsdellite-type lithium titanate is represented by a composition formula of: $Li_{2+y}Ti_3O_7$, wherein y is $0 \leq y \leq 2.25$. Each of layers may be further contained a conductive agent and a binder.

The spinel-type lithium titanate has a characteristic that it does not give rise to the shrinkage or expansion of volume that may result from the charge/discharge reactions. The Ramsdellite-type lithium titanate and the anatase-type $TiO_2$ are large in theoretical capacity and excellent in ionic diffusion velocity. However, these Ramsdellite-type lithium titanate and anatase-type $TiO_2$ are accompanied with a problem that they are liable to generate the shrinkage or expansion thereof resulting from the charge/discharge reactions. Among these Ramsdellite-type lithium titanate and anatase-type $TiO_2$, it is more preferable to use Ramsdellite-type lithium titanate, because it has 200 mAh/g or more in theoretical capacity and high in in-solid diffusion velocity of lithium ion. In an embodiment where the second layer contains Ramsdellite-type lithium titanate as an active material, it also permits to interpose a third layer containing anatase-type $TiO_2$ as an active material between the first layer contacting with the current collector and the second layer disposed to face the separator, thereby creating a negative electrode layer of 3-ply structure.

In the negative electrode which comprises the current collector and the negative electrode layer laminated a plurality of layers each containing an active material, since the spinel-type lithium titanate which is substantially free from volumetric changes on the occasion of charge/discharge reactions is included as the active material in the first layer which is disposed to contact with the current collector, it is possible to enhance the adhesion of the negative electrode layer to the current collector. For this reason, it is now possible to minimize not only the twisting of the negative electrode but also the peeling of the first layer from the current collector that might have been caused by the volumetric changes thereof on the occasion of charge/discharge reactions. Furthermore, since one surface of the second layer containing Ramsdellite-type lithium titanate or anatase-type $TiO_2$ as an active material is disposed to face the separator and another surface of the second layer is disposed to directly contact with or to contact via third layer with this first layer, it is possible to enable the Ramsdellite-type lithium titanate and the anatase-type $TiO_2$ to exhibit the high theoretical capacity and excellent ionic diffusion velocity characteristics thereof. In this case, the negative electrode is not badly affected by the influence of the volumetric changes of the active material, i.e. the volumetric changes of the Ramsdellite-type lithium titanate or of the anatase-type $TiO_2$ that may result from the charge/discharge reactions of battery and may cause the twisting of the electrode and the peeling of the negative electrode layer from the current collector, because the second layer is disposed to directly contact with or to contact via third layer with the first layer which is enhanced the adhesion the current collector. Therefore, the negative electrode which comprises the current collector, and the negative electrode layer formed on the current collector and laminated a plurality of layers each containing a specific active material, is enabled to further increase the capacity, to further enhance the lithium-absorbing/desorbing performance and to further enhance the charge/discharge cycle characteristics of battery as compared with the negative electrode wherein a negative electrode layer containing only lithium titanate is deposited as a negative electrode active material on the current collector thereof.

The ratio between the thickness (T1) of the first layer and a total thickness (Tt) of the negative electrode layer, i.e. "T1/Tt" is preferably not less than 0.1 and not more than 0.5. It should be noted that a total thickness of the negative electrode layer may be the same as that of the conventional negative electrode layer which is constituted by a single layer and has a thickness of 20 to 200 μm for example. If the ratio of "T1/Tt" is less than 0.1, it may become impossible to effectively minimize the twisting of the electrode as well as the peeling of the first layer from the current collector that may be caused by the volumetric changes of the negative electrode layer on the occasion of charge/discharge reactions. On the other hand, if the ratio of "T1/Tt" exceeds 0.5, the ratio of the second layer containing Ramsdellite-type lithium titanate or anatase-type $TiO_2$ as an active material would become too small relative to the total thickness of the negative electrode layer. As a result, it may become difficult to create a negative electrode layer having the high theoretical capacity and excellent ionic diffusion velocity characteristics thereof that caused by the second layer.

The active material (particles of the active material) which is spinel-type lithium titanate, Ramsdellite-type lithium titanate or anatase-type $TiO_2$ has preferably a specific surface area ranging from not less than 5 $m^2/g$ and not more than 50 $m^2/g$. When this specific surface area is 5 $m^2/g$ or more, the active material can be sufficiently secured the absorption/desorption site of lithium, thereby improving the lithium-absorbing/desorbing performance of the battery. When this specific surface area is limited to not more than 50 $m^2/g$, it would become easy to handle the active material on the occasion of manufacturing the negative electrode.

It should be noted that the spinel-type lithium titanate and the Ramsdellite-type lithium titanate may contain not more than 1000 mass-ppm of an element such as Nb, Pb, Fe, Ni, Si, Al, Zr.

The conductive agent is employed for enhancing the collecting performance of the active material and for suppressing the contact resistance of negative electrode layer to the current collector. Examples of the conductive agent are acetylene black, carbon black, graphite.

The binder is employed for enhancing mainly the integrity between the negative electrode layer and the current collector. Examples of the binder are polytetrafluoroethylene (PTFE), poly(vinylidene fluoride) (PVdF), fluorinated rubber, styrene butadiene rubber.

The mixing ratio of the active material, the conductive agent and the binder in the negative electrode layer is preferably not less than 70% by weight and not more than 96% by weight of the active material, not less than 2% by weight and not more than 28% by weight of the conductive agent, and not less than 2% by weight and not more than 28% by weight of the binder. If the mixing ratio of the conductive agent is less than 2 wt %, the current-collecting characteristics of the negative electrode layer may be deteriorated, thus causing the large electric current characteristics of the non-aqueous electrolyte battery to deteriorate. Further, if the mixing ratio of the binder is less than 2 wt %, the bonding strength between the negative electrode layer as well as between the first layer and the current collector may be decreased, thereby possibly deteriorating the cycle characteristics of battery. On the other hand, in viewpoint of increasing the capacity of battery, the mixing ratio of the conductive agent and the binder should be respectively confined to not more than 28 wt %.

The current collector can be made of a material which is electrochemically stable in the electrical potential range which is greater than 1.0 V. Such material is preferably aluminum foil, or aluminum alloy foil containing an element such as Mg, Ti, Zn, Mn, Fe, Cu, Si.

Next, the method of manufacturing the negative electrode will be explained.

(1) Spinel-type lithium titanate as an active material, a conductive agent and a binder are suspended in a common solvent to prepare a first slurry. Further, Ramsdellite-type lithium titanate or anatase-type titanium oxide as an active material, a conductive agent and a binder are suspended in a common solvent to prepare a second slurry. Then, the first slurry is coated on the surface of a current collector and dried to form a first layer. Subsequently, the second slurry is coated and dried to form a negative electrode layer of 2-ply structure on the current collector. Thereafter, the current collector and the negative electrode layer are integrally pressed to manufacture the negative electrode.

(2) The first slurry is coated on the surface of a current collector and, with the coated first slurry being a wet state without subjecting the coated first slurry to drying process, the second slurry is coated, dried and integrally pressed to manufacture the negative electrode having a negative electrode layer of 2-ply structure formed on the current collector.

Through the employment of the method of (2), i.e. a method of coating the second slurry on the first slurry which is still in a wet state prior to the drying step, is adopted in the manufacture of the negative electrode, it becomes possible to enhance the adhesion between the first layer contacting with the current collector and the second layer facing the separator and hence the employment of the aforementioned method of (2) is more preferable.

2) Positive Electrode

The positive electrode comprises a current collector, and a positive electrode layer formed on one or both surfaces of the current collector and containing an active material, a conductive agent and a binder.

The current collector can be use, for example, aluminum foil, or aluminum alloy foil containing an element such as Mg, Ti, Zn, Mn, Fe, Cu, Si.

The active material can be used, for example, oxides, or polymers.

Examples of the oxides are manganese dioxide ($MnO_2$) wherein lithium is absorbed therein, iron oxide, copper oxide, nickel oxide, lithium manganese composite oxides (for example, $Li_xMn_2O_4$ or $Li_xMnO_2$), lithium nickel composite oxides (for example, $Li_xNiO_2$), lithium cobalt composite oxides (for example, $Li_xCoO_2$), lithium nickel cobalt composite oxides (for example, $LiNi_{1-y}Co_yO_2$), lithium manganese cobalt composite oxides (for example, $Li_xMn_yCo_{1-y}O_2$), spinel type lithium manganese nickel composite oxides (for example, $Li_xMn_{2-y}Ni_yO_4$), lithium phosphorus oxide of olivine structure (for example, $Li_xFePO_4$, $Li_xFe_{1-y}Mn_yPO_4$, $Li_xCoPO_4$), iron sulfate ($Fe_2(SO_4)_3$), vanadium oxide (for example, $V_2O_5$). Herein X and y are preferably $0<x\leq1$ and $0<y\leq1$.

The polymers can be used, for example, conductive polymer materials such as polyaniline, polypyrrole; and disulfide-based polymer materials. The active material can be also used sulfur (S), carbon fluoride.

Preferable active material is lithium manganese composite oxides ($Li_xMn_2O_4$), lithium nickel composite oxides ($Li_xNiO_2$), lithium cobalt composite oxides ($Li_xCoO_2$), lithium nickel cobalt composite oxides ($LiNi_{1-y}Co_yO_2$), spinel type lithium manganese nickel composite oxides ($Li_xMn_{2-y}Ni_yO_4$), lithium manganese cobalt composite oxides ($Li_xMn_yCo_{1-y}O_2$), and lithium iron phosphate ($Li_xFePO_4$), these composite oxides exhibiting a high positive electrode voltage. Herein x and y are preferably $0<x\leq1$ and $0<y\leq1$.

The specific surface area of the active material (particles of an active material) is preferably not less than $0.1 \text{ m}^2/\text{g}$ and not more than $10 \text{ m}^2/\text{g}$. When the specific surface area of the active material is confined to this range, it is possible to sufficiently secure the absorption/desorption site of lithium ion, to facilitate the handling thereof in the industrial production and to secure excellent charge/discharge cycle performance of battery.

Examples of the conductive agent are carbonaceous materials such as acetylene black, carbon black, graphite. This conductive agent is effective in enhancing the electronic collecting performance and in suppressing the contact resistance of active material to the current collector.

The binder which is used for bonding the positive electrode layer with the current collector, can be used, for example, polytetrafluoroethylene (PTFE), poly(vinylidene fluoride) (PVdF), fluorinated rubber.

The mixing ratio of the positive electrode active material, the conductive agent and the binder is preferably not less than 80% by weight and not more than 95% by weight of the active material, not less than 3% by weight and not more than 10% by weight of the conductive agent, and not less than 2% by weight and not more than 10% by weight of the binder. When the conductive body is incorporated at 3% by weight or more, it becomes possible to enable the conductive agent to exhibit the aforementioned effects. When the mixing ratio of the conductive agent is confined to not more than 10% by weight, it is possible to minimize the decomposition of the non-aqueous electrolyte on the surface of the conductive agent even during storage at high temperatures. When the binder is incorporated at a mixing ratio of not less than 2 wt %, it is possible to secure a sufficient strength of the positive electrode. When the mixing ratio of binder is confined to not more than 10 wt %, it is possible to decrease the mixing ratio of an insulating component in the positive electrode layer and to decrease the internal resistance of the positive electrode.

In the manufacture of the positive electrode, the active material, the binder and the conductive agent are suspended in a suitable solvent to prepare a slurry. Then, the slurry is coated on the surface of a current collector and dried to form a positive electrode layer, and then pressed to manufacture the positive electrode. Alternatively, a mixture consisting of the active material, the conductive agent and the binder may be formed into pellets for using them to form the positive electrode layer.

3) Separator

The separator can be used, for example, a porous film formed of polyethylene, polypropylene, cellulose or polyvinylidene fluoride (PVdF); and unwoven fabrics formed of synthetic resin. Among them, a porous film formed of polyethylene or polypropylene is preferable from the viewpoint of enhancing safety, because it is capable of being fused at a predetermined temperature, thereby making it possible to cut off electric current.

4) Non-Aqueous Electrolyte

Examples of the non-aqueous electrolyte are a liquid non-aqueous electrolyte which can be prepared by dissolving an electrolyte in an organic solvent, and a gel-like non-aqueous electrolyte which can be obtained by making a liquid electrolyte and a macromolecular material into a composite configuration.

The liquid non-aqueous electrolyte can be prepared by dissolving an electrolyte in an organic solvent at a concentration of not less than 0.5 mol/L and not more than 2.5 mol/L.

Examples of the electrolyte are lithium salts such as lithium perchlorate ($LiClO_4$), lithium phosphate hexafluoride ($LiPF_6$), lithium borate tetrafluoride ($LiBF_4$), lithium arsenate hexafluoride ($LiAsF_6$), lithium trifluorometasulfonate ($LiCF_3SO_3$), bistrifluoromethyl sulfonyliminolithium [$LiN(CF_3SO_2)_2$], and a mixture thereof. Among them, $LiPF_6$ is most preferable, because it can be hardly oxidized even at high electrical potentials.

Examples of the organic solvent are cyclic carbonates such as propylene carbonate (PC), ethylene carbonate (EC) and vinylene carbonate; linear carbonates such as diethylene carbonate (DEC), dimethylene carbonate (DMC) and methylethyl carbonate (MEC); cyclic ethers such as tetrahydrofuran (THF), 2methyl tetrahydrofuran (2Me THF) and dioxorane (DOX); linear ethers such as dimethoxy ethane (DME) and diethoxy ethane (DEE); γ-butyrolactone (GBL); acetonitrile (AN); sulforane (SL). These solvents can be used singly or in combination of two or more.

The macromolecular materials can be used, for example, poly(vinylidene fluoride)(PVdF), polyacrylonitrile (PAN), polyethylene oxide (PEO).

The aforementioned spinel-type lithium titanate and Ramsdellite-type lithium titanate both useful as an active material for a negative electrode are capable of absorbing and desorbing lithium ion in an electrical potential zone in the vicinity of 1.5 V and 1.0 to 1.8 V (vs. $Li/Li^+$), respectively. However, the reducing decomposition of non-aqueous electrolyte is not likely to take place in this electrical potential zone, so that it is difficult to deposit a film of the reduction product of non-aqueous electrolyte on the surface of spinel-type lithium titanate and of Ramsdellite-type lithium titanate. Because of this, the lithium ion that has been absorbed in the spinel-type lithium titanate and Ramsdellite-type lithium titanate is permitted to diffuse into the electrolyte, thereby permitting so-called self-discharging to take place. This self-discharging would become more prominent as the storage environments of battery are brought into higher temperatures.

γ-butyrolactone which is one of the organic solvents to be used herein can be more easily reduced as compared with linear carbonate or with cyclic carbonate, both carbonates being employed in the conventional non-aqueous electrolyte battery. More specifically, the easiness of reduction is compared among these compounds, it can be represented by the order of: γ-butyrolactone>>>ethylene carbonate>propylene carbonate>>dimethyl carbonate>methylethyl carbonate>diethyl carbonate. For this reason, when γ-butyrolactone is added to an electrolyte, it becomes possible to deposit a reduction product film of excellent quality on the surface of spinel-type lithium titanate as well as the surface of Ramsdellite-type lithium titanate even in the operating potential zone of spinel-type lithium titanate and Ramsdellite-type lithium titanate. As a result, it is possible to suppress the self-discharging of battery and to enhance the high-temperature storage characteristics of non-aqueous electrolyte battery. In order to create a protective film of more excellent quality, the mixing ratio of the γ-butyrolactone in the organic solvent is preferably not less than 40% by volume and not more than 95% by volume.

5) Outer Case

The outer case is formed from a laminate film having a thickness of not more than 0.5 mm or formed of a metallic vessel having a film thickness of not more than 1.0 mm. More preferably, the thickness of the metallic vessel is 0.5 mm or less.

The configuration of the outer case may be a flat type (thin type), a square type, a cylindrical type, a coin type or a button type. This outer case may be variously designed depending on the size of battery. For example, it can be designed as an outer case for a small battery which can be mounted on mobile electronic instruments, or as an outer case for a large battery which can be mounted on a two-wheeled vehicle or a four-wheeled vehicle.

The laminate film can be used, for example, a multi-layer film having a metal layer interposed between resin films. The metal layer is preferably formed of aluminum foil or aluminum alloy foil for reducing the weight thereof. The resin layer can be used, for example, polymer materials such as polypropylene (PP), polyethylene (PE), nylon, polyethylene terephthalate (PET). The laminate film can be molded into any desired configuration of outer case through sealing using thermal fuse-bonding.

The metal vessel can be made of aluminum or aluminum alloys. The aluminum alloys are preferably contained magnesium, zinc, silicon. If aluminum alloys containing a transition metal such as iron, copper, nickel, chromium, are used, the quantity of the transition metal is preferably not more than 100 mass-ppm.

Figure 1:
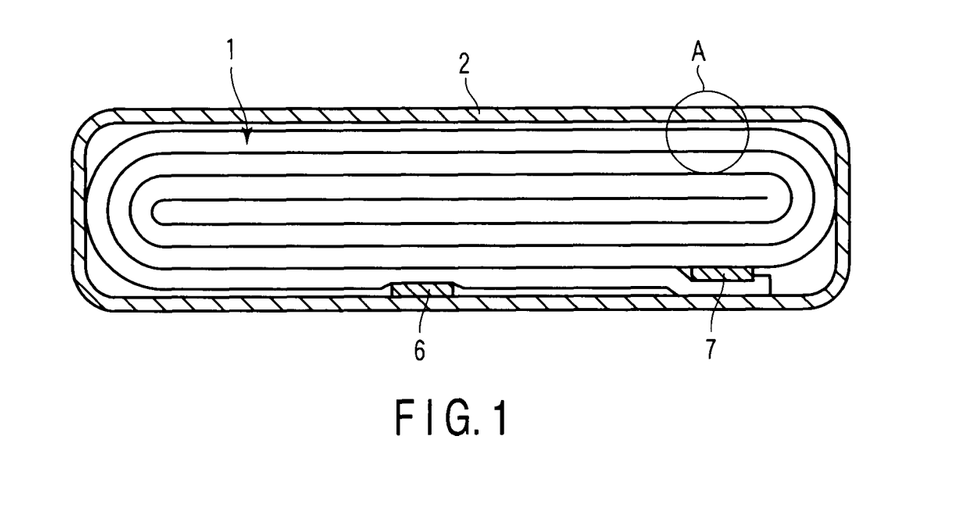
FIG. 1 is a cross-sectional view schematically illustrating a flat type non-aqueous electrolyte battery according to a first embodiment.
Figure 2:
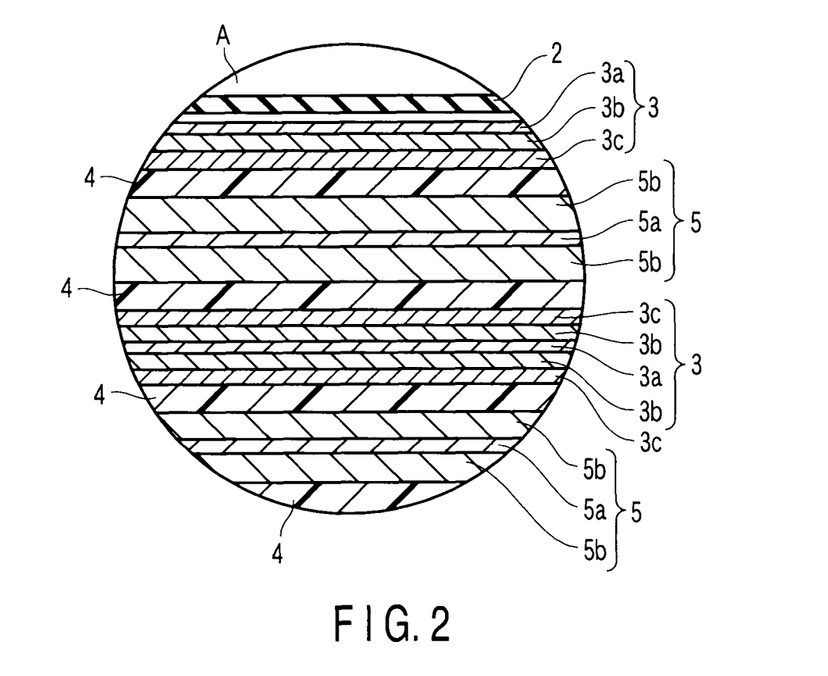
FIG. 2 is an enlarged cross-sectional view illustrating the portion "A" of FIG. 1.

Next, the non-aqueous electrolyte battery (a flat non-aqueous electrolyte battery where the outer case of formed of a laminate film) according to the first embodiment will be explained in detail with reference to FIGS. 1 and 2. FIG. 1 is a cross-sectional view schematically illustrating a thin type non-aqueous electrolyte battery; and FIG. 2 is an enlarged cross-sectional view illustrating the portion "A" of FIG. 1. It should be noted that each of FIGS. 1 and 2 depicts a schematic view for assisting the understanding of the present invention and the explanation thereof so that the configuration, dimension and dimensional ratio of some of the constituent components may differ from those of the actual apparatus. However, specific geometry of these components can be optionally modified with reference to the following descriptions and the conventional technology.

A flattened wound electrode group 1 is housed in a bag-like outer case 2 which is formed from a laminate film comprising a couple of resin films with a metal layer interposed between them. The flattened wound electrode group 1 is constructed by spirally wounding and press-molding a laminate comprising mentioning from outside, a negative electrode 3, a separator 4, a positive electrode 5 and a separator 4. As shown in FIG. 2, the negative electrode 3 constituting the outermost husk is constructed such that a first negative electrode layer 3b containing spinel-type lithium titanate as an active material and a second negative electrode layer 3c containing Ramsdellite-type lithium titanate or anatase-type titanium oxide as an active material are laminated on an inner surface of a current collector 3a. Other negative electrodes 3 are respectively constructed such that the aforementioned first and second negative electrode layers 3b and 3c are formed on the opposite surfaces of the current collector 3a. The negative electrode layer of the negative electrode 3 is formed of a laminate structure comprising the first negative electrode layer 3b which contains spinel-type lithium titanate and is contacted with the current collector 3a, and a second negative electrode layer 3c which contains Ramsdellite-type lithium titanate or anatase-type titanium oxide and is disposed to face (contact with) the separator 4. The positive electrode 5 is constructed such that a positive electrode layer 5b is formed on the opposite surfaces of a current collector 5a.

In the vicinity of the outer circumferential edge portion of the electrode group 1, a negative electrode terminal 6 is electrically connected to the current collector 3a of the negative electrode 3 constituting the outermost husk and a positive electrode terminal 7 is electrically connected to the current collector 5a of the inner positive electrode 5. These negative electrode terminal 6 and positive electrode terminal 7 are led out through an opening of the bag-like outer case 2. For example, a liquid non-aqueous electrolyte is poured into the bag-like outer case 2 through the opening of the outer case 2. The opening of the bag-like outer case 2 is heat-sealed with the negative electrode terminal 6 and positive electrode terminal 7, thereby completely sealing the flattened wound electrode group 1 and the liquid non-aqueous electrolyte.

The negative electrode terminal can be made of materials which are conductive and electrochemically stable under the condition where the electrical potential of metal lithium ion is not less than 1.0 V and not more than 3.0 V. Examples of such material are aluminum or aluminum alloy containing Mg, Ti, Zn, Mn, Fe, Cu, Si. Preferably, the negative electrode terminal should be made of the same material as that of the current collector in order to minimize the contact resistance thereof to the current collector.

The positive electrode terminal can be made of materials which are electrically conductive and electrically stabile under the condition where the electrical potential of metal lithium ion is not less than 3 V and not more than 5 V. Examples of such material are aluminum or aluminum alloys containing any of elements such as Mg, Ti, Zn, Mn, Fe, Cu, Si. Preferably, the positive electrode terminal should be made of the same material as that of the current collector in order to minimize the contact resistance thereof to the current collector.

According to the first embodiment described above, since the negative electrode comprises a current collector, and a negative electrode layer formed on the current collector and comprising a plurality of layers laminated each other and containing a different active material each other, the layers comprising a first layer which is contacted with the current collector and contains spinel-type lithium titanate as an active material, and a second layer which is disposed to face the separator and contains Ramsdellite-type lithium titanate or anatase-type titanium oxide as an active material, it is possible to provide a non-aqueous electrolyte battery which is capable of minimizing not only the twisting of the electrode but also the peeling of the first layer from the current collector that might have been caused by the volumetric changes thereof on the occasion of charge/discharge reactions, thereby making it possible to obtain a non-aqueous electrolyte battery exhibiting enhanced charge/discharge cycle characteristics and enhanced capacity.

Second Embodiment

The battery pack according to the second embodiment is provided with a plurality of the aforementioned non-aqueous electrolyte batteries (single cells) which are electrically connected with each other in series, in parallel, or in series and parallel.

One example of such a battery pack will be explained in detail with reference to FIGS. 3 and 4. The single cell can be used the flat type battery as shown in FIG. 1.

A plurality of single cells 21, each formed of the flatting type non-aqueous electrolyte battery shown in FIG. 1, are laminated in such a manner that the negative electrode terminal 6 and the positive electrode terminal 7, both being externally led out, are arrayed to extend in the same direction and that they are clamped together by means of an adhesive tape 22, thereby creating a combined battery 23. These single cells 21 are electrically connected with each other in series as shown in FIG. 4.

A printed wiring board 24 is disposed to face the side wall of each of the single cells 21 where the negative electrode terminal 6 and the positive electrode terminal 7 are externally led out. On this printed wiring board 24 are mounted a thermistor 25, a protection circuit 26, and a terminal 27 for electrically connecting the printed wiring board 24 with external instruments. It should be noted that in order to prevent unwanted electric connection with the wirings of the combined battery 23, an insulating plate (not shown) is attached to the surface of the printed wiring board 24 that faces the combined battery 23.

A lead 28 for the positive electrode is electrically connected, through one end thereof, with the positive electrode terminal 7 which is located at the lowest layer of the combined battery 23. The other end of the lead 28 is inserted into and electrically connected with a connector 29 for the positive terminal of the printed wiring board 24. A lead 30 for the negative electrode is electrically connected, through one end thereof, with the negative electrode terminal 6 which is located at the highest layer of the combined battery 23. The other end of the lead 30 is inserted into and electrically connected with a connector 31 for the negative terminal of the printed wiring board 24. These connectors 29 and 31 are electrically connected, through the interconnects 32 and 33 formed on the printed wiring board 24, with the protection circuit 26.

The thermistor 25 is used for detecting the temperature of single cells 21 and the signals thus detected are transmitted to the protection circuit 26. This protection circuit 26 is designed to cut off, under prescribed conditions, the wiring 34a of plus-side and the wiring 34b of minus-side which are interposed between the protection circuit 26 and the terminal 27 for electrically connecting the printed wiring board 24 with external instruments. The expression of "under prescribed conditions" herein means the conditions where the temperature detected by the thermistor 25 becomes higher than a predetermined temperature for example. Further, the expression of "under prescribed conditions" herein also means the conditions where the over-charging, over-discharging and over-current of the single cells 21 are detected. The detection of this over-charging is performed against the single cells 21 individually or entirely. In the case where the single cells 21 are to be detected individually, either the voltage of cell may be detected or the potential of the positive electrode or negative electrode may be detected. In the latter case, a lithium electrode is inserted, as a reference electrode, into individual cells 21. In the case of the battery pack shown in FIGS. 3 and 4, a wiring 35 is connected with each of the single cells 21 for detecting the voltage thereof and the signals detected are transmitted, through this wiring 35, to the protection circuit 26.

On all of the sidewalls of the combined battery 23 excepting one sidewall where the negative electrode terminal 6 and the positive electrode terminal 7 are protruded, a protective sheet 36 made of rubber or synthetic resin is disposed, respectively.

The combined battery 23 is housed, together with each of protective sheet 36 and the printed wiring board 24, in a case 37. Namely, the protective sheet 36 is disposed on the opposite inner sidewalls constituting the longer sides of the case 37 and on one inner sidewall constituting one shorter side of the case 37. On the other sidewall constituting the other shorter side of the case 37 is disposed the printed wiring board 24.

The combined battery 23 is positioned in a space which is surrounded by the protective sheet 36 and the printed wiring board 24. A cap 38 is attached to the top of the case 37.

By the way, a thermally shrinkable tube may be used in place of the adhesive tape 22 for fixing the combined battery 23. In this case, the protective sheet is disposed on the opposite sidewalls of combined battery 23 and then the thermally shrinkable tube is disposed to surround these protective sheets, after which the thermally shrinkable tube is allowed to thermally shrink, thereby fastening the combined battery 23.

Figure 3:
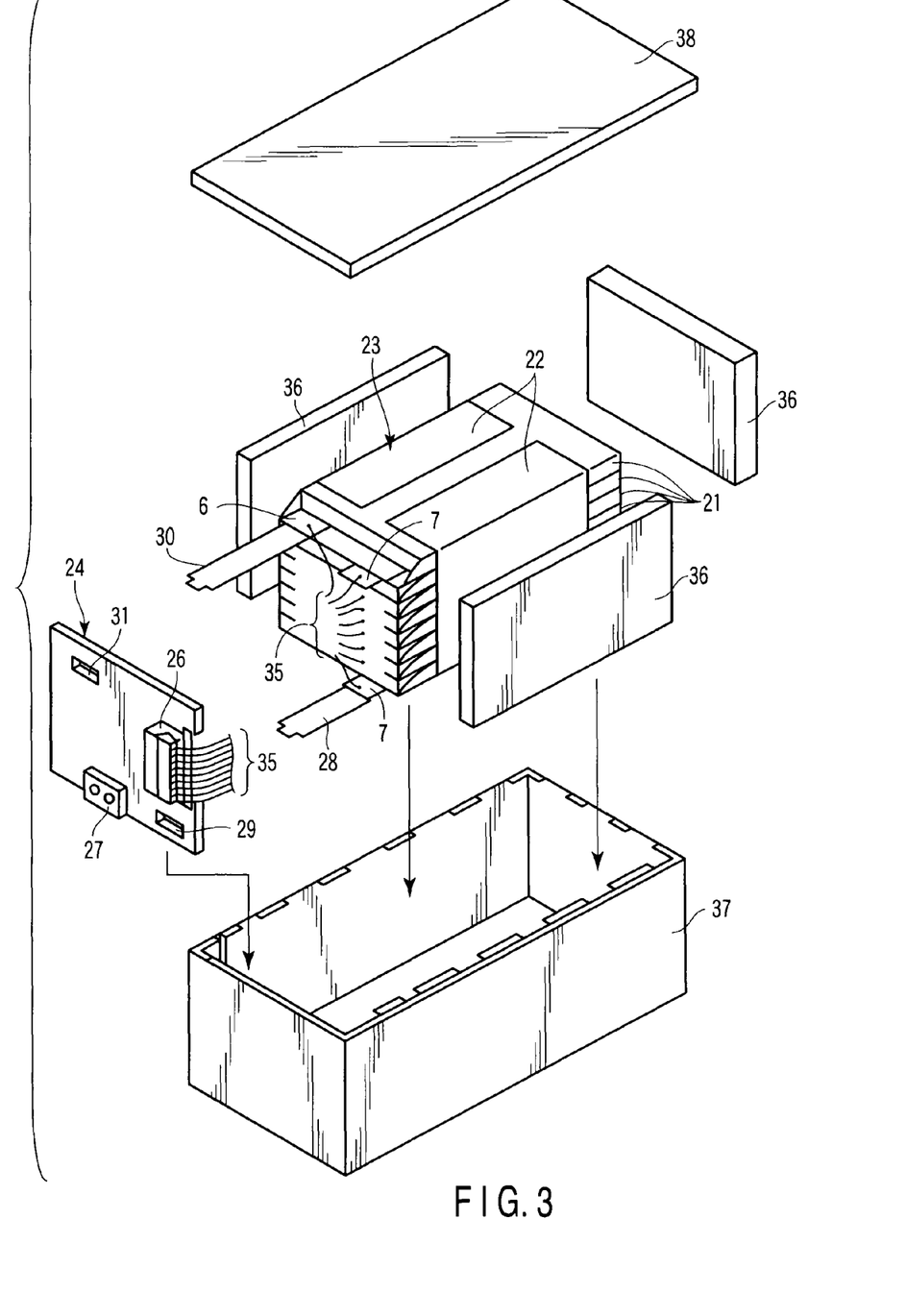
FIG. 3 is an exploded perspective view illustrating a battery pack according to a second embodiment.
Figure 4:
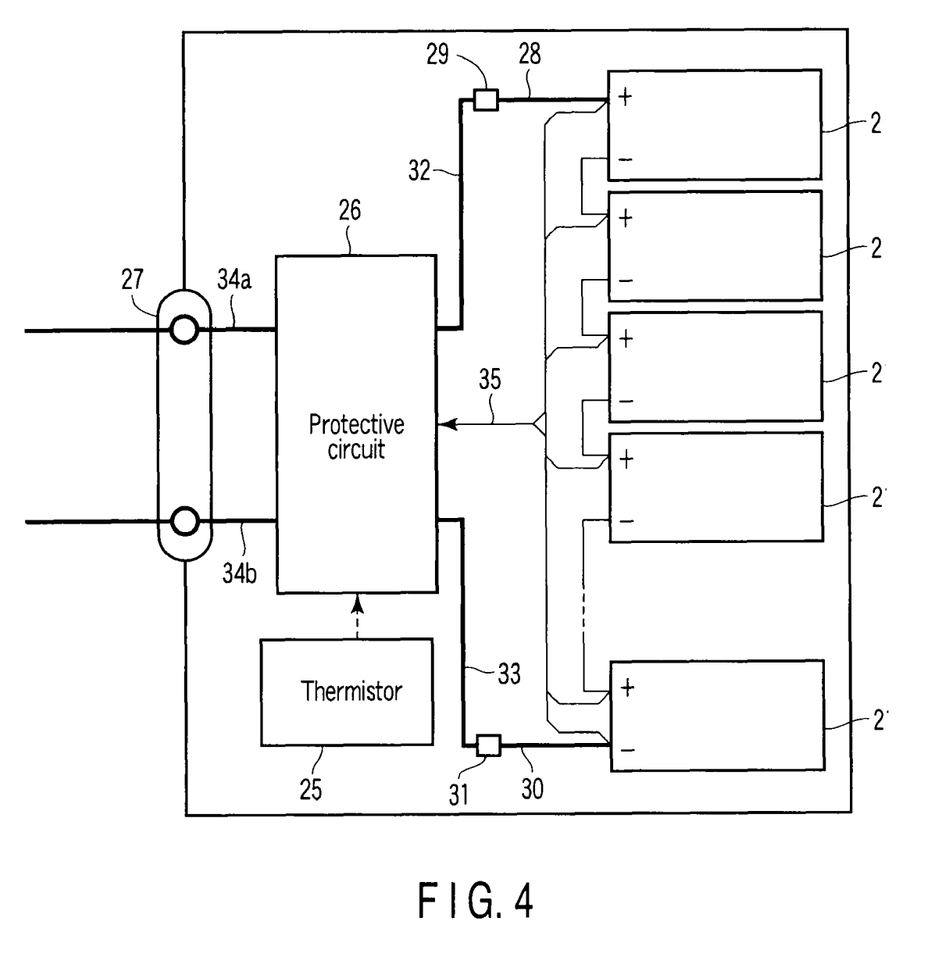
FIG. 4 is a block diagram illustrating the battery pack shown in FIG. 3.

In the embodiment shown in FIGS. 3 and 4, the single cells 21 are electrically connected to each other in series. However, a plurality of single cells may be electrically connected to each other in parallel in order to increase the capacity of a combined battery. Also, a plurality of battery packs, each assembled as described above, may be electrically connected to each other in series or in parallel.

Further, specific features of the battery pack may be optionally modified depending on the end-use thereof. As for the end-use of the battery pack, it can be preferably applied to those where excellent cycle characteristics are desired in large current performance. More specifically, the battery pack can be employed as a power source for digital cameras or as an on-vehicle type power source for two-wheeled or four-wheeled hybrid electric vehicles, for two-wheeled or four-wheeled electric vehicles, or for electric mopeds. Especially, the battery pack is most suited for use as an on-vehicle power source.

It should be noted that in the applications of battery where high-temperature characteristics are desirable as in the case of on-vehicle type battery pack, it is preferable to use a non-aqueous electrolyte containing a mixed solvent comprising a mixture of at least two kinds of materials selected from the group consisting of propylene carbonate (PC), ethylene carbonate (EC) and γ-butyrolactone (GBL), or a non-aqueous electrolyte containing γ-butyrolactone (GBL).

The present invention will be further explained in detail with reference to specific examples which are not intended to limit the scope of the present invention.

Example 1

100 parts by weight of spinel-type lithium titanate, 7 parts by weight of carbon as a conductive agent and 2 parts by weight of PVdF as a binder were added to N-methyl pyrrolidone (NMP) and mixed together to prepare a first slurry. Further, 100 parts by weight of Ramsdellite-type lithium titanate, 7 parts by weight of carbon as a conductive agent and 2 parts by weight of PVdF as a binder were added to N-methyl pyrrolidone (NMP) and mixed together to prepare a second slurry.

Then, the first slurry was coated on the surface of a current collector formed of an aluminum foil (99.99% in purity and 10 μm in average crystal grain diameter) having a thickness of 15 μm. Under the condition where the first slurry was still in a wet state, the second slurry was coated on a film of the first slurry, dried and pressed to manufacture a negative electrode. The negative electrode thus obtained was constructed by the current collector, and a negative electrode layer of 2-ply structure formed on the current collector and having a thickness of 30 μm.

The thickness of the first layer (containing spinel-type lithium titanate) which was disposed to contact with the current collector as well as the thickness of the second layer (containing Ramsdellite-type lithium titanate) which was disposed to face a separator described later were respectively measured by making use of a scanning electron microscope (SEM) equipped with an energy-dispersion-type X-ray analyzer. Namely, it was possible to distinguish the current collector portion from the negative electrode layer portion by observing the section of the negative electrode by means of the SEM. The thickness of the first layer contacting with the current collector as well as the thickness of the second layer disposed to face the separator was measured through the linear analysis of the negative electrode layer portion by making use of the EDX. Namely, when these first and second layers were subjected to the linear analysis of the section of negative electrode to be performed perpendicular to the direction of the negative electrode layer starting from the current collector side, since the quantity of Ti that could be detected from the first layer contacting with the current collector was not the same with the quantity of Ti that could be detected from the second layer disposed to face the separator, it was possible to measure the thickness of each of these first and second layers. More specifically, in the linear analysis to be performed perpendicular to the direction of the negative electrode layer starting from the current collector side, the detection of Ti was initiated from the first layer contacting with the current collector and then became approximately constant within the region of the first layer. When this linear analysis was advanced to reach the second layer which was disposed to face the separator, the quantity of Ti to be detected from the second layer was increased. In this case, the quantity of Ti to be detected from the second layer became approximately constant within the region of the second layer disposed to face the separator. As long as this could be recognized in the observation by means of the SEM, the layer was assumed as being the second layer which was disposed to face the separator. In this analysis, the distance between the point when Ti was started to be detected and the point when the content of Ti was increased to not less than 4% by weight at the interface between the these layers was assumed as being the thickness of the first layer which was disposed to contact with the current collector. In this case, there was nothing that could be determined as being the noises in the measurement of the thickness of these layers.

From the results of aforementioned measurement, it was possible to confirm that the ratio between the thickness of the first layer contacting with the current collector and the thickness of the second layer disposed to face the separator was 5:5. Namely, the ratio T1/Tt between the thickness T1 of the first layer contacting with the current collector and a total thickness of the negative electrode layer was confirmed as being 0.5.

Example 2

A negative electrode was manufactured in the same manner as described in Example 1 except that the ratio T1/Tt between the thickness T1 of the first layer contacting with the current collector and a total thickness of the negative electrode layer was adjusted to 0.08 on the occasion of successively coating the first slurry and the second slurry on the surface of the current collector to form the spinel-type lithium titanate-containing first layer which was disposed to contact with the current collector and to form the Ramsdellite-type lithium titanate-containing second layer which was disposed to face the separator to thereby form the laminated negative electrode layer.

Example 3

A negative electrode was manufactured in the same manner as described in Example 1 except that the ratio T1/Tt between the thickness T1 of the first layer contacting with the current collector and a total thickness of the negative electrode layer was adjusted to 0.2 on the occasion of successively coating the first slurry and the second slurry on the surface of the current collector to form the spinel-type lithium titanate-containing first layer which was disposed to contact with the current collector and to form the Ramsdellite-type lithium titanate-containing second layer which was disposed to face the separator to thereby form the laminated negative electrode layer.

Example 4

A negative electrode was manufactured in the same manner as described in Example 1 except that the ratio T1/Tt between the thickness T1 of the first layer contacting with the current collector and a total thickness of the negative electrode layer was adjusted to 0.6 on the occasion of successively coating the first slurry and the second slurry on the surface of the current collector to form the spinel-type lithium titanate-containing first layer which was disposed to contact with the current collector and to form the Ramsdellite-type lithium titanate-containing second layer which was disposed to face the separator to thereby form the laminated negative electrode layer.

Comparative Example 1

100 parts by weight of Ramsdellite-type lithium titanate, 7 parts by weight of carbon as a conductive agent and 2 parts by weight of PVdF as a binder were added to N-methyl pyrrolidone (NMP) and mixed together to prepare a slurry. Then, this slurry was coated on the surface of a current collector formed of an aluminum foil (99.99% in purity and 10 μm in average crystal grain diameter) having a thickness of 15 μm and then dried and pressed to manufacture a negative electrode. The negative electrode thus obtained was constructed by the current collector, and a negative electrode layer of a single-layer structure formed on the current collector and having a thickness of 30 μm.

Comparative Example 2

80 parts by weight of Ramsdellite-type lithium titanate, 20 parts by weight of spinel-type lithium titanate, 7 parts by weight of carbon as a conductive agent and 2 parts by weight of PVdF as a binder were added to N-methyl pyrrolidone (NMP) and mixed together to prepare a slurry. Then, this slurry was coated on the surface of a current collector formed of an aluminum foil (99.99% in purity and 10 μm in average crystal grain diameter) having a thickness of 15 μm and then dried and pressed to manufacture a negative electrode. The negative electrode thus obtained was constructed by the current collector, and a negative electrode layer of a single-layer structure formed on the current collector and having a thickness of 40 μm.

Comparative Example 3

50 parts by weight of Ramsdellite-type lithium titanate, 50 parts by weight of spinel-type lithium titanate, 7 parts by weight of carbon as a conductive agent and 2 parts by weight of PVdF as a binder were added to N-methyl pyrrolidone (NMP) and mixed together to prepare a slurry. Then, this slurry was coated on the surface of a current collector formed of an aluminum foil (99.99% in purity and 10 μm in average crystal grain diameter) having a thickness of 15 μm and then dried and pressed to manufacture a negative electrode. The negative electrode thus obtained was constructed by the current collector, and a negative electrode layer of a single-layer structure formed on the current collector and having a thickness of 35 μm.

The negative electrodes obtained in the Examples 1 to 4 and Comparative Examples 1 to 3 were respectively cut out to obtain sample pieces each having a size of 2 cm×2 cm to use them as a working electrode. Then, a counter electrode formed of a lithium metal foil and having a greater area than that of the working electrode was disposed to face the working electrode with a glass filter (separator) being interposed between them. A reference electrode formed of lithium metal was also inserted in such a manner that the reference electrode was prevented from contacting with the working electrode and with the counter electrode. These electrodes were placed in a triode type glass cell and these working electrode, counter electrode and reference electrode were respectively connected to the terminals of the glass cell. Then, a non-aqueous electrolyte was poured into the glass cell so as to enable the separator and the electrodes to be sufficiently impregnated with the electrolyte and then the glass vessel was hermetically closed. It should be noted that the non-aqueous electrolyte was prepared by dissolving 2.0 mol/L of lithium borate tetrafluoride ($LiBF_4$) in a solvent consisting of a mixture of ethylene carbonate and γ-butyrolactone which were mixed at a ratio of 1:2 in volume ratio.

The assembled glass cell was placed inside a thermostat which was kept at a temperature of 25° C. and subjected to charging/discharging with an electric current corresponding to 1 C. Then, the discharge capacity at the fiftieth cycle and the ratio of discharge capacity (capacity retention rate) at the fiftieth cycle relative to the discharge capacity at the first discharge capacity were determined. The results obtained are shown in the following Table 1.

TABLE 1

| | T1/Tt ratio in negative electrode layer | Discharge capacity at 50th cycle (mAh/g) | Discharge capacity retention rate (%) |
| --- | --- | --- | --- |
| Example 1 | 0.5 | 152.7 | 90.9 |
| Example 2 | 0.08 | 154.1 | 86.6 |
| Example 3 | 0.2 | 158.7 | 90.7 |
| Example 4 | 0.6 | 149.7 | 90.7 |
| Comparative Example 1 | — | 125.6 | 85.1 |
| Comparative Example 2 | — | 129.3 | 85.5 |
| Comparative Example 3 | — | 121.9 | 83.5 |

As clearly seen from above Table 1, the glass cells which were provided with the negative electrodes of Examples of 1 to 4, each having a laminated negative electrode layer comprising a first layer which contains spinel-type lithium titanate as a negative electrode active material and is contacted with the current collector and a second layer which contains Ramsdellite-type lithium titanate as a negative electrode active material and is disposed to face the separator, were all capable of exhibiting high values in terms of the discharge capacity at the fiftieth cycle and the capacity retention rate and also exhibiting excellent charge/discharge cycle characteristics as compared with the glass cells of Comparative Examples of 1 to 3 each having a negative electrode layer of single-layer structure.

The reasons why the glass cells which were provided with the negative electrodes of Examples of 1 to 4 were all capable of exhibiting high discharge capacity and high capacity retention rate can be attributed to the facts that the negative electrode layer thereof was formed of a laminated structure comprising the first layer (containing spinel-type lithium titanate) disposed to contact with the current collector and the second layer (Ramsdellite-type lithium titanate) disposed to face the separator, thereby making it possible to suppress not only the twisting of the negative electrode but also the peeling of the negative electrode layer from the current collector on the occasion of charge/discharge cycles. Especially, in the case of the glass cells which were provided with the negative electrodes of Examples of 1 and 3 where the ratio of the thickness T1 of the first layer disposed to contact with the current collector and a total thickness Tt of the negative electrode layer (i.e., T1/Tt) was confined to the range of 0.1-0.5, it was possible to exhibit higher discharge capacity and higher capacity retention rate, thereby enabling them to exhibit more excellent charge/discharge cycle characteristics as compared with the glass cells which were provided with the negative electrodes of Examples of 2 and 4.

Whereas, in the case of the glass cell which was provided with the negative electrode of Comparative Example 1 wherein the negative electrode layer thereof contained only Ramsdellite-type lithium titanate as an active material, the discharge capacity and capacity retention rate were deteriorated due to the twisting of the negative electrode and the peeling of the negative electrode layer from the current collector on the occasion of charge/discharge cycles.

Further, in the case of the glass cells which was provided with the negative electrodes of Comparative Examples 2 and 3 wherein the negative electrode layer thereof contained Ramsdellite-type lithium titanate together with spinel-type lithium titanate, the discharge capacity and capacity retention rate were deteriorated due to the twisting of the negative electrode and the peeling of the negative electrode layer from the current collector as a result of the volumetric changes of Ramsdellite-type lithium titanate on the occasion of charge/discharge reactions. Namely, the negative electrode provided with a negative electrode layer of single structure containing Ramsdellite-type lithium titanate together with spinel-type lithium titanate is accompanied with the problems that, due to the influence of the volumetric changes of Ramsdellite-type lithium titanate on the occasion of charging/discharging reaction, the twisting of the electrode as well as the peeling of the first layer from the current collector is caused to occur. As a result, the glass cells which were respectively provided with the negative electrodes of Comparative Examples 2 and 3 were caused to exhibit almost the same degree of low discharge capacity and low capacity retention rate as those of the glass cell which was provided with the negative electrode of Comparative Example 1 wherein only Ramsdellite-type lithium titanate was contained as an active material in the negative electrode layer thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A non-aqueous electrolyte battery comprising:
   a negative electrode comprising a current collector, and a negative electrode layer formed on one or both surfaces of the current collector;
   a positive electrode; and
   a separator interposed between the negative electrode and the positive electrode;
   wherein the negative electrode layer of the negative electrode comprises at least two layers containing different active materials, respectively, the at least two layers comprising a first layer which is contacted with the current collector and contains spinel-type lithium titanate as a first active material, and an uppermost layer whose outer surface is contacted with the separator and which contains Ramsdellite-type lithium titanate or anatase-type titanium oxide as a second active material.

2. The battery according to claim 1, wherein the spinel-type lithium titanate is represented by a composition formula of: Li4+xTi5O12, wherein x is $0 \leq x \leq 3$.

3. The battery according to claim 1, wherein the Ramsdellite-type lithium titanate is represented by a composition formula of: Li2+yTi3O7, wherein y is $0 \leq y \leq 2.25$.

4. The battery according to claim 1, wherein spinel-type lithium titanate, the Ramsdellite-type lithium titanate or the anatase-type titanium oxide has a specific surface area ranging from not less than 5 m2/g and not more than 50 m2/g.

5. The battery according to claim 1, wherein the current collector is formed from aluminum foil or aluminum alloy foil.

6. The battery according to claim 1, wherein the first layer and the uppermost layer of the negative electrode layer further contain respectively a conductive agent and a binder.

7. The battery according to claim 1, wherein a ratio between the thickness (T1) of the first layer and a total thickness (Tt) of the negative electrode layer "T1/Tt" is not less than 0.1 and not more than 0.5.

8. The battery according to claim 1, wherein the negative electrode layer has a 2-ply structure consisting of the first layer and the uppermost layer, the uppermost layer containing Ramsdellite-type lithium titanate as a second active material.

9. The battery according to claim 8, wherein a ratio between the thickness (T1) of the first layer and a total thickness (Tt) of the first layer and the uppermost layer "T1/Tt" is not less than 0.1 and not more than 0.5.

10. The battery according to claim 1, wherein the negative electrode layer has a 3-ply structure consisting of the first layer, a second layer contacted with the first layer and the uppermost layer, the second layer containing anatase-type titanium oxide as a third active material, the uppermost layer containing Ramsdellite-type lithium titanate as the second active material.

11. The battery according to claim 1, wherein the positive electrode comprises a current collector, and a positive electrode layer formed on the current collector and containing composite oxides selected from the group of lithium manganese composite oxides, lithium nickel composite oxides, lithium cobalt composite oxides, lithium nickel cobalt composite oxides, spinel type lithium manganese nickel composite oxides, lithium manganese cobalt composite oxides, and lithium iron phosphate.

12. The battery according to claim 1, wherein further comprises a non-aqueous electrolyte comprising lithium salt, and an organic solvent containing γ-butyrolactone.

13. A battery pack comprising a plurality of the non-aqueous electrolyte batteries each defined in claim 1, the batteries being electrically connected with each other in series, in parallel, or in series and parallel.

* * * * *